(12) United States Patent
Kippenberg et al.

(10) Patent No.: US 10,969,276 B2
(45) Date of Patent: Apr. 6, 2021

(54) DUAL-FREQUENCY-COMB SPECTROMETER AND SPECTROSCOPY METHOD FOR SPECTROSCOPIC INVESTIGATION OF A SAMPLE

(71) Applicant: ECOLE POLYTECHNIQUE FEDERALE DE LAUSANNE (EPFL), Lausanne (CH)

(72) Inventors: Tobias Kippenberg, Lausanne (CH); Hairun Guo, Lausanne (CH); Junqiu Liu, Lausanne (CH); Wenle Weng, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 119 days.

(21) Appl. No.: 16/446,197

(22) Filed: Jun. 19, 2019

(65) Prior Publication Data
US 2020/0400495 A1    Dec. 24, 2020

(51) Int. Cl.
  *G01J 3/10* (2006.01)
  *G02F 1/365* (2006.01)
  *G02F 1/35* (2006.01)

(52) U.S. Cl.
  CPC .......... *G01J 3/10* (2013.01); *G01J 3/108* (2013.01); *G02F 1/365* (2013.01); *G01J 2003/102* (2013.01); *G02F 2001/3528* (2013.01); *G02F 2201/06* (2013.01); *G02F 2203/11* (2013.01)

(58) Field of Classification Search
  CPC ..... G01J 3/10; G02F 1/365; G02F 2001/3503
  See application file for complete search history.

(56) References Cited

U.S. PATENT DOCUMENTS

2018/0024104 A1* 1/2018 Islam .................. A61B 5/0086
                                                           250/341.1

OTHER PUBLICATIONS

Baumann et al. (2018). Dual-comb spectroscopy with tailored spectral broadening in Si3N4 nanophotonics. arXiv:1811.05906.
Benton et al. (2009). Coupling induced anomalous group velocity dispersion in nonlinear arrays of silicon photonic wires. Optics Express, 17(7), 5879-5884.

(Continued)

*Primary Examiner* — David P Porta
*Assistant Examiner* — Fani Boosalis
(74) *Attorney, Agent, or Firm* — Caesar Rivise, PC (57) ABSTRACT

A dual-frequency-comb spectrometer and a method for spectroscopic investigation of a sample are described. The spectrometer includes first and second frequency comb devices for emitting laser pulses along first and second light paths, wherein the repetition frequency of the laser pulses emitted by the second device is offset from that of the first device. First and second multi-core waveguides including at least two separate single core waveguides having field-coupling via a coupling gap therebetween are arranged in the first and second light paths. The sample is irradiated by the second frequency comb in the second light path. A detector device is arranged in a third light path where the first and second light paths are combined, for simultaneously sensing the first frequency comb and the second frequency comb after an interaction with the sample. A computing device receives output of the detector device and calculates spectroscopic properties of the sample.

14 Claims, 6 Drawing Sheets

(56) References Cited

OTHER PUBLICATIONS

Carlson et al. (2017). Self-referenced frequency combs using high-efficiency silicon-nitride waveguides. Optics Letters, 42(12), 2314-2317.
Coddington et al. (2010). Coherent dual-comb spectroscopy at high signal-to-noise ratio. Physical Review A 82, 043817-1-043817-13.
Coddington et al. (2016). Dual-comb spectroscopy. Optica, 3(4), 414-426.
Cruz et al. (2015). Mid-infrared optical frequency combs based on difference frequency generation for molecular spectroscopy. Optics Express 23(20), 26814-26824.
Cundiff et al. (2003). Colloquium: Femtosecond optical frequency combs. Reviews of Modern Physics, 75(1), 325-342.
De Nobriga et al. (2010). Supermode dispersion and waveguide-to-slot mode transition in arrays of silicon-on-insulator waveguides. Optics Letters, 35(23), 3925-3927.
Dudley et al. (2006). Supercontinuum generation in photonic crystal fiber. Reviews of Modern Physics, 78(4), 1135-1184.
Erny et al. (2007). Mid-infrared difference-frequency generation of ultrashort pulses tunable between 3.2 and 4.8μm from a compact fiber source. Optics Letters, 32(9), 1138-1140.
Brassani et al. (2018). Highly efficient 4 micron light generation through fs-fiber laser driven supercontinuum in Si3N4 waveguides. arXiv:1806.06633.
Guo et al. (2018). Mid-infrared frequency comb via coherent dispersive wave generation in silicon nitride nanophotonic waveguides. Nature Photonics, 12, 330-336.
Guo et al. (2018). Soliton-induced mid-infrared Cherenkov radiation in nano-photonic hybrid waveguides. Advanced Photonics (BGPP, IPR, NP, NOMA, Sensors, Networks, SPPCom, SOF), OSA Technical Digest (online) (Optical Society of America, 2018), paper JTu6B.1.
Hickstein et al. (2017). Ultrabroadband supercontinuum generation and frequency-comb stabilization using on-chip waveguides with both cubic and quadratic nonlinearities. Physical Review Applied, 8, 014025-1-014025-8.
Holzwarth et al. (2000). Optical frequency synthesizer for precision spectroscopy. Physical Review Letters, 85(11), 2264-2267.
Keilmann et al. (2004). Time-domain mid-infrared frequency-comb spectrometer. Optics Letters, 29(13), 1542-1544.
Keilmann et al. (2012). Mid-infrared frequency comb spanning an octave based on an Er fiber laser and difference-frequency generation. J Infrared Milli Terahz Waves, 33, 479-484.
Lee. (1998). Pulse compression using coupled-waveguide structures as highly dispersive elements. Applied Physics Letters, 73(19), 2715-2717.
Lee. (2000). A semiconductor coupled-waveguide structure as a dispersion compensator. Jpn. J. Appl. Phys., 39(3A), 1140-1145.
Liu et al. (2018). Double inverse nanotapers for efficient light coupling to integrated photonic devices. Optics Letters, 13(14), 3200-3203.
Liu et al. (2018). Ultralow-power chip-based soliton microcombs for photonic integration. Optica, 5(10), 1347-1353.
Marom et al. (1984).Relation between normal-mode and coupled-mode analyses of parallel waveguides. IEEE Journal of Quantum Electronics, 20(12), 1311-1319.
Mayer et al. (2016). Offset-free gigahertz midinfrared frequency comb based on optical parametric amplification in a periodically poled lithium niobate waveguide. Physical Review Applied, 6, 054009-1-054009-10.
Moss et al. (2013). New CMOS-compatible platforms based on silicon nitride and Hydex for nonlinear optics. Nature Photonics, 7, 597-607.
Muraviev et al. (2018). Massively parallel sensing of trace molecules and their isotopologues with broadband subharmonic mid-infrared frequency combs. Nature Photonics. 12, 209-215.
Nader et al. (2018). Versatile silicon-waveguide supercontinuum for coherent mid-infrared spectroscopy. APL Photonics, 3, 036102-1-036102-10.
Newbury et al. (2010). Sensitivity of coherent dual-comb spectroscopy. Optics Express, 18(8), 7929-7945.
Okawachi et al. (2018). Carrier envelope offset detection via simultaneous supercontinuum and second-harmonic generation in a silicon nitride waveguide. Optics Letters, 43(19), 4627-4630.
Peschel et al. (1995). A compact device for highly efficient dispersion compensation in fiber transmission. Applied Physics Letters, 67(15), 2111-2113.
Pfeiffer et al. (2018). Ultra-smooth silicon nitride waveguides based on the Damascene reflow process: fabrication and loss origins. Optica, 5(7), 884-892.
Schliesser et al. (2005). Frequency-comb infrared spectrometer for rapid, remote chemical sensing. Optics Express, 13(22), 9029-9038.
Schliesser et al. (2012). Mid-infrared frequency combs. Nature Photonics, 6, 440-449.
Smolski et al. (2016). Coherence properties of a 2.6-7.5 μm frequency comb produced as a subharmonic of a Tm-fiber laser. Optics Letters, 41(7), 1388-1391.
Timmers et al. (2018). Molecular fingerprinting with bright, broadband infrared frequency combs. Optica, 5(6), 727-732.
Villares et al. (2014). Dual-comb spectroscopy based on quantum-cascade-laser frequency combs. Nature Communications, 5:5192, 1-9.
Yariv. (1973). Coupled-mode theory for guided-wave optics. IEEE Journal of Quantum Electronics, 9(9), 919-933.
Ycas et al. (2018). High-coherence mid-infrared dual-comb spectroscopy spanning 2.6 to 5.2 μm. Nature Photonics, 12, 202.
Yu et al. (2018). Silicon-chip-based mid-infrared dual-comb spectroscopy. Nature Communications, 9, 1869.

* cited by examiner

DUAL-FREQUENCY-COMB SPECTROMETER AND SPECTROSCOPY METHOD FOR SPECTROSCOPIC INVESTIGATION OF A SAMPLE

The present invention was made with US Government support under W31P4Q-16-1-0002 contract awarded by Defense Advanced Research Projects Agency (DARPA) and FA9550-15-1-0099 contract awarded by Air Force Office of Scientific Research, USAF. The US Government has certain rights in the invention.

FIELD OF THE INVENTION

The invention relates to a dual-frequency-comb spectrometer for a spectroscopic investigation of a sample and to a dual-frequency-comb spectroscopy method employing the dual-frequency-comb spectrometer. Applications of the invention are available in all fields of investigating samples by spectroscopy, e. g. in chemistry, biochemistry, pharmaceutics, physics, and/or environmental techniques.

PRIOR ART

In the present specification, reference is made to the following prior art illustrating the technical background of the invention:

[1] Keilmann, F., Gohle, C. & Holzwarth, R. Time-domain mid-infrared frequency-comb spectrometer. Opt. Lett. 29, 1542-1544 (2004);
[2] Schliesser, A., Brehm, M., Keilmann, F. & van der Weide, D. W. Frequency-comb infrared spectrometer for rapid, remote chemical sensing. Opt. Express 13, 9029-9038 (2005);
[3] Holzwarth, R. et al. Optical frequency synthesizer for precision spectroscopy. Phys. Rev. Lett. 85, 2264 (2000);
[4] Cundiff, S. T. & Ye, J. Colloquium: Femtosecond optical frequency combs. Rev. Mod. Phys. 75, 325 (2003);
[5] Coddington, I., Newbury, N. & Swann, W. Dual-comb spectroscopy. Optica 3, 414-426 (2016);
[6] Schliesser, A., Picqué, N. & Hänsch, T. W. Mid-infrared frequency combs. Nat. Photon. 6, 440 (2012);
[7] Villares, G., Hugi, A., Blaser, S. & Faist, J. Dual-comb spectroscopy based on quantum-cascade-laser frequency combs. Nat. Commun. 5, 5192 (2014);
[8] Yu, M. et al. Silicon-chip-based mid-infrared dual-comb spectroscopy. Nat. Commun. 9, 1869 (2018);
[9] Cruz, F. C. et al. Mid-infrared optical frequency combs based on difference frequency generation for molecular spectroscopy. Opt. Express 23, 26814-26824 (2015);
[10] Ycas, G. et al. High-coherence mid-infrared dual-comb spectroscopy spanning 2.6 to 5.2 µm. Nat. Photon. 12, 202 (2018);
[11] Timmers, H. et al. Molecular fingerprinting with bright, broadband infrared frequency combs. Optica 5, 727-732 (2018);
[12] Muraviev, A., Smolski, V., Loparo, Z. & Vodopyanov, K. Massively parallel sensing of trace molecules and their isotopologues with broadband subharmonic mid-infrared frequency combs. Nat. Photon. 12, 209 (2018);
[13] Erny, C. et al. Mid-infrared difference-frequency generation of ultrashort pulses tunable between 3.2 and 4.8 µm from a compact fiber source. Opt. Lett. 32, 1138-1140 (2007);
[14] Smolski, V., Yang, H., Gorelov, S., Schunemann, P. & Vodopyanov, K. Coherence properties of a 2.6-7.5 µm frequency comb produced as a subharmonic of a Tm-fiber laser. Opt. Lett. 41, 1388-1391 (2016);
[15] Dudley, J. M., Genty, G. & Coen, S. Supercontinuum generation in photonic crystal fiber. Rev. Mod. Phys. 78, 1135 (2006);
[16] Keilmann, F. & Amarie, S. Mid-infrared frequency comb spanning an octave based on an Er fiber laser and difference-frequency generation. J. Infrared Millim. Terahertz Waves 33, 479-484 (2012);
[17] Guo, H. et al. Mid-infrared frequency comb via coherent dispersive wave generation in silicon nitride nanophotonic waveguides. Nat. Photon. 12, 330 (2018);
[18] Okawachi, Y. et al. Carrier envelope offset detection via simultaneous supercontinuum and second-harmonic generation in a silicon nitride waveguide. Opt. Lett. 43, 4627-4630 (2018);
[19] Carlson, D. R. et al. Self-referenced frequency combs using high-efficiency silicon-nitride waveguides. Opt. Lett. 42, 2314-2317 (2017);
[20] Hickstein, D. D. et al. Ultrabroadband supercontinuum generation and frequency-comb stabilization using on-chip waveguides with both cubic and quadratic nonlinearities. Phys. Rev. Appl. 8, 014025 (2017);
[21] Mayer, A. S. et al. Offset-free gigahertz midinfrared frequency comb based on optical parametric amplification in a periodically poled lithium niobate waveguide. Phys. Rev. Applied 6, 054009 (2016);
[22] Moss, D. J., Morandotti, R., Gaeta, A. L. & Lipson, M. New CMOS-compatible platforms based on silicon nitride and Hydex for nonlinear optics. Nat. Photon. 7, 597 (2013);
[23] Grassani, D. et al. Highly efficient 4 micron light generation through fs-fiber laser driven supercontinuum in $Si_3N_4$ waveguides. arXiv:1806.06633 (2018);
[24] Nader et al. APL Photonics 3, 036102 (2018);
[25] Baumann, E. et al. Dual-comb spectroscopy with tailored spectral broadening in $Si_3N_4$ nanophotonics. arXiv: 1811.05906 (2018);
[26] Coddington, I., Swann, W. & Newbury, N. Coherent dual-comb spectroscopy at high signal-to-noise ratio. Phys. Rev. A 82, 043817 (2010);
[27] Newbury, N. R., Coddington, I. & Swann, W. Sensitivity of coherent dual-comb spectroscopy. Opt. Express 18, 7929-7945 (2010);
[28] Liu, J. et al. Double inverse nanotapers for efficient light coupling to integrated photonic devices. Opt. Lett. 43, 3200-3203 (2018);
[29] Yariv, A. Coupled-mode theory for guided-wave optics. IEEE J. Quantum Electron. 9, 919-933 (1973);
[30] Peschel, U., Peschel, T. & Lederer, F. A compact device for highly efficient dispersion compensation in fiber transmission. Appl. Phys. Lett. 67, 2111-2113 (1995);
[31] Lee, Y. Pulse compression using coupled-waveguide structures as highly dispersive elements. Appl. Phys. Lett. 73, 2715-2717 (1998);
[32] Lee, Y. A semiconductor coupled-waveguide structure as a dispersion compensator. Jpn. J. Appl. Phys. 39, 1140 (2000);
[33] Benton, C. J. & Skryabin, D. V. Coupling induced anomalous group velocity dispersion in nonlinear arrays of silicon photonic wires. Opt. Express 17, 5879-5884 (2009);
[34] De Nobriga, C. E. et al. Supermode dispersion and waveguide-to-slot mode transition in arrays of silicon-on-insulator waveguides. Opt. Lett. 35, 3925-3927 (2010);

[35] Marom, E., Ramer, O. & Ruschin, S. Relation between normal-mode and coupled-mode analyses of parallel waveguides. IEEE J. Quantum Electron. 20, 1311-1319 (1984);

[36] Pfeiffer, M. H. P. et al. Ultra-smooth silicon nitride waveguides based on the Damascene reflow process: fabrication and loss origins. Optica 5, 884-892 (2018);

[37] Liu, J. et al. Ultralow-power chip-based soliton microcombs for photonic integration. Optica 5, 1347-1353 (2018); and

[38] H. Guo et al. Soliton-induced mid-infrared Cherenkov radiation in nano-photonic hybrid waveguides. Advanced Photonics Congress, OSA, Zurich, Switzerland, 2018 (https://www.osapublishing.org/abstract.cfm?uri=Networks-2018-JTu6B.1).

It is generally known to employ the ability to distinguish molecules via their mid-infrared (mid-IR) vibrational absorption e. g. in pharmaceutical industry, environmental process monitoring or in organic chemical synthesis. Typically, Fourier-transform infrared spectroscopy (FTIR spectroscopy) is employed for collecting mid-IR absorption spectra. Recently, mid-IR dual-frequency-comb spectrometers have demonstrated superior resolution and faster acquisition of such absorption spectra, compared to FTIR spectroscopy. Yet, despite significant progress in extending dual-comb spectroscopy to the mid-IR, the widespread use of this technique is still outstanding, and compounded by the complexity in generating mutually coherent and broadband mid-IR optical frequency combs.

With more details, mid-IR is one of the most useful wavelength regions for spectroscopy, due to the presence of fundamental vibrational transitions in molecules. Typically, mid-IR is divided into the functional group region (4000-1500 $cm^{-1}$) and the backbone region (1500-500 $cm^{-1}$). The former is used to sense stretching or bending vibrations of common functional groups, e.g. hydrocarbons, which may be applied generally to most compounds as well as existing in trace gases (featuring narrow spectral lines), while the latter is referred to as unique skeletal vibrations of a specific molecule. Therefore mid-IR spectroscopy can identify samples by the mere inspection of spectra, which is used extensively in organic synthesis, polymer science, petrochemical engineering, pharmaceutical industry and food analysis. Moreover it has medical potential as human breath contains numerous volatile chemical compounds (VOC), of which many can be associated with diseases.

Presently, mid-IR spectroscopy is primarily based on Fourier transform infrared (FTIR) spectrometers that are bulky and have limited resolution and acquisition time. Over the past decade dual-frequency-comb spectroscopy (also called dual comb spectroscopy, DCS) has been developed as an approach that can alleviate some of these shortcomings [1], [2]. A dual-frequency-comb spectrometer has two spectrometer branches each guiding one of two frequency combs with a mutual frequency offset. After an interaction of one of the frequency combs with the sample to be investigated in one of the spectrometer branches, the frequency combs are superimposed and simultaneously sensed with a detector. The Fourier transformation of the detector signal provides the sample spectrum to be obtained.

This approach, emerged with the invention of optical frequency combs [3], [4], enables fast detection, scanning without moving parts, high resolution spectra, and has no limitation to the size, as the device length is independent on resolution, contrary to FTIR. DCS has today seen significant advances [5], and has also been successfully applied to an increasing portion of the mid-IR spectroscopy, using a number of mid-IR comb sources [6], including quantum cascade lasers (QCLs) [7], microresonator Kerr frequency combs [8], difference frequency generation (DFG) [1], [9] and [10], cascaded quadratic nonlinear process [11] and optical parametric oscillators (OPO) [12].

Yet to date, generating phase locked mid-IR frequency combs that exhibit high brightness, broad bandwidth and fine resolution remains an outstanding challenge. The most advanced approaches have used DFG, which typically requires the synchronization of two laser beams and features limited instantaneous spectral bandwidth. To reach a larger spectral coverage, either mechanically tuning the phase matching of the nonlinear crystal [13] or implementing a chirped quasi-phasematching (QPM) is required [10]. OPO based mid-IR frequency combs have attained some of the broadest spectra to date [14], allowing for massively parallel sensing of trace molecules [12]. Although capable of a miniature size, this approach is mostly based on solid-state laser cavities that contain discrete bulk optics and components.

Another conventional approach is based on the supercontinuum generation in a nanophotonic integrated silicon nitride ($Si_3N_4$) nonlinear waveguide, driven by a conventional low-noise fiber-laser-based optical frequency comb in the well-developed telecommunication band (telecom-band). Supercontinuum generation is one of the most dramatic nonlinear optical processes [15], which enables spectral broadening of conventional femtosecond mode-locked lasers, coherently reaching optical octaves. This process has been essential for femtosecond lasers to be self-referenced, making fully stabilized optical frequency combs [4], yet it constitutes a way to access ultrabroadband and coherent comb sources potentially imperative to applications. While being extensively studied in the past decade, in particular being widely applied in DFG [9], [13], [16], the supercontinuum process has to date rarely been exploited for direct mid-IR comb generation as well as for mid-IR DCS.

Recently, advances in the fabrication of dispersion-engineered integrated waveguides have led to lithographically tailorable supercontinuum generation with a broad bandwidth spanning from visible to the mid-IR, at low pulse energies [17], [18], and have been applied for laser self-referencing [19] and offset frequency detection [18], [20], as well as for DFG [21]. In particular, $Si_3N_4$ waveguides, combining a wide transparency with dispersion engineering via nano-fabrication process [22], have been demonstrated to support mid-IR frequency combs based on dispersive wave generation from a femtosecond erbium-fiber laser [17], [23]. In this way, they provide access to the high-demand mid-IR range by bridging an efficient and coherent link with well-developed fiber laser technology in the near-infrared.

However, conventional supercontinuum generation in nonlinear waveguides still has a substantial limitation. While mid-IR dispersive waves are viable in conventional single-core waveguides, the conversion efficiency is limited due to a structured dispersion profile underlying the supercontinuum generation ([17], [25]). For obtaining a flat spectrum of supercontinuum generation, shaping a single non-linear waveguide by providing a notch over the whole waveguide length has been suggested in [24]. However, the notched waveguide has disadvantages in terms of the complex cross-sectional waveguide shape, manufacturing the waveguide, efficiency of coupling a light field into the waveguide. According to [24], a dual comb spectroscopy application of the notched waveguide is proposed. However, the notched waveguide is provided in one of the spectrometer branches only, thus requiring another technique for generating a frequency comb in the second branch. Another complex nano-photonic waveguide structure with dispersion engineering is disclosed in [38].

OBJECTIVE OF THE INVENTION

The objective of the invention is to provide an improved dual-frequency-comb spectrometer for a spectroscopic investigation of a sample and an improved dual-frequency-comb spectroscopy method being capable of avoiding limitations of conventional techniques. In particular, the dual-frequency-comb spectroscopy is to be provided with a spectrometer based on supercontinuum generation in non-linear waveguides, wherein the nonlinear waveguides have a less structured dispersion profile, the supercontinuum generation is improved in terms of power and spectral bandwidth, the nonlinear waveguides have a simple shape which can be easily manufactured, the spectrometer has a less complex configuration, the supercontinuum generation has an increased efficiency and increased wavelength range, the spectrometer has new applications and/or the spectrometer is suitable for routine high sensitivity applications in practical use.

BRIEF SUMMARY OF THE INVENTION

These objectives are correspondingly solved by a dual-frequency-comb spectrometer having the features of the main claim and by a dual-frequency-comb spectroscopy method employing the dual-frequency-comb spectrometer. Preferred embodiments and applications of the invention arise from the dependent claims.

According to a first general aspect of the invention, the above objective is solved by a dual-frequency-comb spectrometer (in the following also briefly called: the spectrometer) being adapted for a spectroscopic investigation of a sample. The spectrometer comprises a first frequency comb source device being configured for emitting a first sequence of laser pulses with a first repetition frequency along a first light path and a second frequency comb source device being configured for emitting a second sequence of laser pulses with a second repetition frequency along a second light path. Each of the first and second frequency comb source devices comprises a stabilized pulse laser source, preferably a fiber-laser-based frequency comb source, emitting one of the sequences of laser pulses, which can be considered as initial frequency combs in the frequency domain. Due to the generation with the pulse laser sources, the initial frequency combs still have a relatively narrow bandwidth compared with the bandwidth obtainable by supercontinuum generation. Both repetition frequencies have a mutual frequency offset. Each of the first and second frequency comb source devices have a pulse output with a power (energy per pulse) being sufficient for driving supercontinuum generation in a waveguide made of an optically non-linear material. For providing a reference and without limiting the scope of the invention, it is assumed here that the second repetition frequency has a frequency offset relative to the first repetition frequency. Furthermore, the second light path is adapted to accommodate the sample to be investigated.

The spectrometer further comprises a first waveguide device being arranged in the first light path for receiving the first sequence of laser pulses and for creating a first frequency comb by supercontinuum generation and a second waveguide device being arranged in the second light path for receiving the second sequence of laser pulses and for creating a second frequency comb by supercontinuum generation. The second light path is configured for irradiating the sample with the second frequency comb, e. g. by providing a sample receptacle in the second light path and/or by flowing the sample along a sample path crossing the second light path. Each of the first and second waveguide devices has an input end for receiving one of the first and second sequences of laser pulses and an output end for emitting one of the first and second frequency combs. Each of the first and second waveguide devices is made of an optically non-linear waveguide material being adapted for creating the first and second frequency combs by supercontinuum generation. The first and second frequency comb source devices are adapted for creating the first and second sequences of laser pulses with an output power allowing to drive the supercontinuum generation in the first and second waveguide devices.

Furthermore, the spectrometer comprises a detector device which is arranged in a third light path where the first and second light paths are combined downstream of the interaction of the second frequency comb with the sample, for simultaneously sensing the first frequency comb and the second frequency comb after the interaction with the sample. A computing device is arranged for receiving an output of the detector device and for calculating spectroscopic properties of the sample based on the detector output of the detector device, in particular by employing Fourier transformation of the detector output.

According to the invention, each of the first and second waveguide devices is a multi-core waveguide having a multi-core waveguide section comprising at least two separate single core waveguides having field-coupling via a coupling gap therebetween. Each of the waveguide devices comprises two or more single core waveguides, preferably having a straight shape, particularly preferred having a rectangular cross-sectional shape, i. e. a longitudinally extending cuboid shape with plane, non-structured waveguide side faces along the multi-core waveguide section. The single core waveguides are arranged with a mutual spacing therebetween. Preferably, the single core waveguides have a longitudinal length in a range from 2 mm to 20 mm. The waveguides of each waveguide device preferably are arranged in parallel with mutual distances between the waveguides. The coupling gaps separate the light guiding sections of the waveguides completely from each other. The gaps between the waveguides can be evacuated or filled with any material, like a gas, a liquid and/or a solid, having a refractive index above the refractive index of the waveguides. With preferred examples, the coupling gaps can be filled with $SiO_2$, $Al_2O_3$, or air. Field-coupling of the single core waveguides comprises an electromagnetic interaction of light field modes guided by the different single core waveguides of each waveguide device, in particular a mutual influence of the light field modes on each other.

According to a second general aspect of the invention, the above objective is solved by a dual-frequency-comb spectroscopy method for spectroscopic investigation of a sample, wherein the dual-frequency-comb spectrometer according to the first general aspect of the invention is employed. According to the invention, the sample is provided in the second light path, while simultaneously creating the first frequency comb by supercontinuum generation with the first waveguide device and the second frequency comb by supercontinuum generation with the second waveguide device. The sample is irradiated with the second frequency comb, so that a spectral content of the second frequency comb is changed by an interaction of the second frequency comb with the sample, in particular by an absorption and/or reflection of the second frequency comb at the sample. The first and second frequency combs are superimposed and simultaneously detected with the detector device. Spectroscopic properties of the sample are calculated from the detector output of the detector device.

As a main advantage of the invention, replacing a conventional single-core waveguide for supercontinuum generation by the inventive multi-core coupled structure of the multi-core waveguide allows dispersion-engineering, i. e. introducing and/or changing dispersion, from mutual field-coupling and enables flattening of the dispersion profile. The multi-core waveguide provides new degrees of freedom in setting the dispersion profile by adjusting waveguide geometry parameters, in particular geometrical properties of the single-core waveguides, like height and width, and the spacing(s) thereof. The waveguide geometry parameters can be adjusted on the basis of numerical simulations of wave guiding and field coupling and/or experimental tests as outlined below. Accordingly, the mid-IR supercontinuum generation can be enhanced in terms of both the power and the spectral bandwidth. With the improved dispersion profile, the supercontinuum generation has an increased efficiency and substantially increased wavelength range, thus providing the spectrometer with increased precision and reliability and less measuring artefacts due to structures waveguide dispersion.

By using hybrid modes of a coupled pair of single core waveguides (waveguide doublet) or more coupled waveguides, the dispersion landscape (shape of dispersion curve in dependency on wavelength $\lambda$ or frequency $\omega$, in particular relative phase constant compared with the pump pulse, i.e. $\beta(\omega)-\beta s(\omega)$) can be tailored, e. g. in a lithographic process of manufacturing the waveguides, such that it supports flattened and ultra-broadband supercontinuum generation in the mid-IR, directly from the output of the first and second frequency comb source devices, like femtosecond fiber lasers. Using two mid-IR supercontinua created by the first and second waveguide devices, broadband dual-comb spectroscopy is realized, e. g. covering a functional group region from 2800 cm$^{-1}$ to 3600 cm$^{-1}$, comprising more than 100,000 comb lines, or frequency intervals included therein, and allowing for e. g. parallel gas-phase detection with high sensitivity, spectral resolution and speed. In addition to traditional functional groups, their isotopologues, like carbon-13 and deuterium, also can be resolved in such supercontinuum based dual-comb spectroscopy, which reveal specific natural abundance on the earth.

The invention combines frequency comb source devices, like e. g. fiber lasers, and chip scale nonlinear photonics, optionally in conjunction with digital coherent data averaging, allowing mid-IR dual-comb spectroscopy for use outside of the protected laboratory environment. Coherent averaging on the acquired data signal preferably is implemented which can significantly increase the signal-to-noise ratio (SNR) ([26], [27]).

In particular, the invention results in mid-IR frequency combs that exhibit an instantaneous bandwidth of up to 1000 cm$^{-1}$, with power exceeding 1 mW, which is sufficient to implement DCS. Contrary to the notched waveguides of [24], the multi-core waveguide has advantages in terms of the increased number of degrees of freedom in setting the dispersion profile as well as the easy manufacturing of the single-core waveguides.

According to a preferred embodiment of the invention, each of the first and second waveguide devices has only one single waveguide being arranged for incoupling the first and second sequences of laser pulses, resp. Accordingly, one of the single core waveguides of the first waveguide device is a first input waveguide being arranged for receiving the first sequence of laser pulses, and one of the single core waveguides of the second waveguide device is a second input waveguide being arranged for receiving the second sequence of laser pulses. Advantageously, the use of a single waveguide for incoupling the pulse sequences improves the incoupling efficiency.

The first and second input waveguides preferably have a length above the length of the remaining waveguides of the waveguide devices. The length difference provides a first input section and a second input section of each of the first and second waveguide devices. According to a further preferred embodiment of the invention, the input sections provided by the first and second input waveguides have a double-inverse taper of the waveguide shape. The multi-core waveguide section of each waveguide device starts after the input section only, i. e. there is no field-coupling of the first and second input waveguides with any neighboring waveguides.

The double-inverse taper shape of the first and second input waveguides has an advantageous effect as a mode filter. Due to the provision of the double-inverse taper shape, only an anti-symmetric mode of the waveguide is selectively excited (see e. g. [28]). This facilitates to exploit anomalous group velocity dispersion (GVD) in the mid-IR for engineering the supercontinuum. For example, with the inverse taper in the beginning, the TE00 mode is excited, followed by the further guiding and shaping in the multi-core waveguide section. The longitudinal length of the double-inverse taper shape is selected based on numerical simulations of field propagation within the waveguide.

According to a further preferred embodiment of the invention, each of the input sections of the first and second input waveguides has a length being selected such that a pulse broadening point, where pulse broadening by supercontinuum generation starts, is after the input sections, and is within the multi-core waveguide section. The position of the pulse broadening point is determined by the optical non-linearity of the waveguide material and an operation condition of the first and second frequency comb source devices, as e. g. determined by a control unit thereof, in particular the power setting of the first and second frequency comb source devices. Advantageously, positioning the pulse broadening point in the multi-core waveguide section only ensures that the supercontinuum generation of the first and second frequency combs is determined by the dispersion design in the multi-core waveguide section, thus improving the efficiency the flattening of the dispersion landscape. The appropriate position of the pulse broadening point can be tested by numerical simulations and/or by practical tests, e. g. by investigation evanescent fields in the multi-core waveguide section.

If according to another modification of the invention, each single core waveguide in the first and second waveguide devices has a rectangular cross-section shape and each of the first and second input waveguides has a width or a height which is different than the remaining single core waveguides of the first and second waveguide devices, advantages for filtering waveguide modes can be obtained.

Preferably, the first and second waveguide devices are monolithically formed on a common substrate. Thus, advantages in terms of manufacturing the waveguides, preferably in a single manufacturing step, are obtained.

Further preferred features of the invention are summarized in the following. Preferably, each of the first and second waveguide devices comprises two, three or four single core waveguides. Particularly preferred, both of the first and second waveguide devices have the same number of single core waveguides. Additionally or alternatively, the single core waveguides are made of $Si_3N_4$, Si, GaP or AlN. These materials have particular advantages in terms of optical nonlinearity and available processing techniques when manufacturing the waveguide devices. Additionally or alternatively, the single core waveguides have a width in a range from 0.01 µm to 5 µm and a height in a range from 0.01 µm to 2.5 µm. The inventors have found that lower quantities of width and height reduce the efficiency of creating the frequency combs, and values above the limits reduce the capability of designing the dispersion landscape. Additionally or alternatively, the coupling gaps between neighboring waveguides have a width in a range from 0.01 µm to 5 µm. The inventors have found that the effect of designing the dispersion landscape is pronounced even in this range.

With preferred application of the invention, the first and second sequences of laser pulses have a center wavelength in a range from 750 nm to 2400 nm, and the first and second frequency comb cover a spectral region from 4166.67 $cm^{-1}$ to 13333.33 $cm^{-1}$. Additionally or alternatively, the first and second sequences of laser pulses have a repetition frequency in a range from 1 MHz to 100 GHz, and the frequency offset is selected in a range from 1 Hz to 100 MHz.

BRIEF DESCRIPTION OF THE DRAWINGS

Further details and advantages of the invention are described in the following with reference to the attached drawings, which schematically show in.

PREFERRED EMBODIMENTS OF THE INVENTION

Features of preferred embodiments of the invention are described in the following with reference to the configuration of the waveguide devices each with two single core waveguides and the operation thereof for creating the frequency combs. It is emphasized that the implementation of the invention is not restricted to the details of the illustrated examples, but correspondingly possible with changed parameters, in particular with changed number and/or geometry of the single core waveguides. Furthermore, the implementation of the invention is not restricted to the use of the fiber lasers as frequency comb source devices, but correspondingly possible with other pulse lasers. Details of selecting operation conditions of the spectrometer, in particular features of selecting the frequency offset of the frequency combs or analyzing the detector output, are not described as they are known per se from conventional DCS.

Exemplary reference is made to mid-IR dual-comb gas-phase spectroscopy, in which dual mid-IR frequency combs are generated via the coherent supercontinuum process in nanophotonic chip-based $Si_3N_4$ waveguides, seeded by a mutually locked dual-frequency-comb source at the telecom-band (i.e. about 1550 nm). The application of the invention is not restricted to these materials and this wavelength range but also possible with other wavelength ranges.

Features of Embodiments of the Dual-Frequency-Comb Spectrometer

Figure 1:
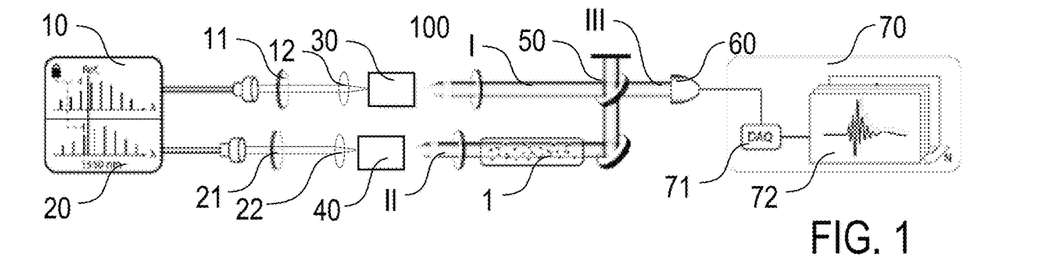
FIG. 1: features of preferred embodiments of the inventive dual-frequency-comb spectrometer.

FIG. 1 schematically illustrates features of embodiments of the dual-frequency-comb spectrometer 100 with a first frequency comb source device 10, a second frequency comb source device 20, a first waveguide device 30, a second waveguide device 40, a beam combiner device 50, a detector device 60 and a computing device 70. A first light path I is spanned from the first frequency comb source device 10 via incoupling optics, comprising a half wave plate 11 and a focusing lens 12, and the first waveguide device 30 to the beam combiner device 50. A second light path II is spanned from the second frequency comb source device 20 via incoupling optics, comprising a half wave plate 21 and a focusing lens 22, the second waveguide device 40 and a sample receptacle 1 to the beam combiner device 50, where the first and second light paths I, II are combined into a third light path III towards the detector device 60. The beam combiner device 50 comprises a semi-transmissive mirror having a transparency in the mid-infrared range. The detector device 60 is a mid-infrared photodetector. The computing device 70 comprises a data acquisition unit 71 (DAQ) receiving an output of the detector device 60 and a computer unit 72 running a software for calculating spectroscopic properties of the sample based on the output of the detector device 60.

Each of the first and second frequency comb source devices 10, 20 comprises e. g. an ultralow noise femtosecond fiber laser with sub-MHz individual linewidth (e. g. Menlo M-combs, a femtosecond Erbium-fiber laser, wavelength about 1550 nm, repetition rate $f_{rep}$ about 250 MHz).

The first and second frequency comb source devices 10, 20 have the carrier-offset frequency locked via self-referencing, and one comb mode optically locked to a shared reference laser (not shown) (at about 1541 nm, the laser is free-running and a daily shift in frequency is of the order of 10 MHz). Optical locking is implemented based on a control loop employing a beating signal of the frequency comb source device and the reference laser as it is known per se in pulse laser techniques. The locked mode index is different by one, which leads to a small difference in the repetition rate of the initial frequency combs, i.e. $\Delta f_{rep} \approx 320$ Hz, and in principle allows the dual-comb spectrometer 100 to cover a large span in the optical window, i.e. about 100 THz.

The mid-IR frequency comb generated by the supercontinuum process in the first and second waveguide devices 30, 40 can be considered as the spectral extension of the initial frequency comb structure of the original pump source (first and second frequency comb source devices 10, 20), therefore it inherits the full properties of the initial frequency combs. Based on such a configuration, a phase-resolved mid-IR dual-comb spectrometer 100 is provided, with one mid-IR frequency comb passing along the second light path II through the sample receptacle 1, like a gas cell for gas-phase detection or a container or a liquid flow cell for liquid-phase detection, and the other frequency comb travelling along the first light path I serves as the reference.

After the interaction with the sample, the two frequency combs are interfered on the mid-IR photodetector 60 (e. g. VIGO PV-4TE, mercury cadmium telluride (HgCdTe) detector). Due to the difference in the repetition rate $\Delta f_{rep}$, a radio frequency (RF) comb is generated, which is composed of distinguishable heterodyne beats between pairs of optical comb teeth. In the time domain, it corresponds to a periodic interferogram pattern that can be directly recorded by the detector device 60.

The data acquisition is implemented by a field programmable gate array (FPGA). Realtime coherent averaging process is preferably provided by the computer unit 72 for multiple sets of signal. For the averaging process, triggered by the pulse repetition rate of one of the near-IR pump frequency comb source devices 10, 20, the FPGA data acquisition unit 71 can record the output voltage level of the mid-IR detector device 60 and continuously save up to e. g. 84 interferograms. The data is then read out on the computer unit 72, which in the meantime co-adds these interferograms and performs averaging to get a single averaged interferogram (so-called realtime coherent averaging). After each set of e. g. 84 interferograms record in the FPGA data acquisition unit 71, the data communicating and saving on the computer unit 72 will introduce a dead time of about 8 s. Then tens to hundreds of such saved and coherent-averaged interferograms are post-processed with phase calibration, and thus a single interferogram is obtained by averaging the phase-corrected interferograms (so-called offline averaging). To calculate the time-normalized DCS SNR and the figure of merit (DCS quality factor), for offline averaging only the effective data acquisition time is taken into account (dead time excluded).

The normalized signal-to-noise ratio of the spectrometer 100 has a peak value of $25/\sqrt{s}$ at the region of 3400 $cm^{-1}$ (where the spectral intensity is strongest). The averaged signal-to-noise ratio is estimated as $10/\sqrt{s}$. Therefore, a figure of merit of $1.0 \times 10^6/\sqrt{s}$ can be concluded for the inventive dual-comb spectrometer 100, which is mostly limited by the RIN on the mid-IR frequency combs. Although this figure of merit does not reach the shot-noise limit, it is comparable to reported results in other works, which mostly for DFG based dual-comb spectrometers is $1\text{-}6 \times 10^6/\sqrt{s}$.

Details of the First and Second Waveguide Devices

The first and second waveguide devices 30, 40 are manufactured on a common substrate or on separate substrates with lithographic techniques which are known per se. For increasing the durability of the waveguides, they can be coated with a protective cover layer. The single core waveguides of the waveguide devices 30, 40 can be made of the same or different materials.

Figure 2:
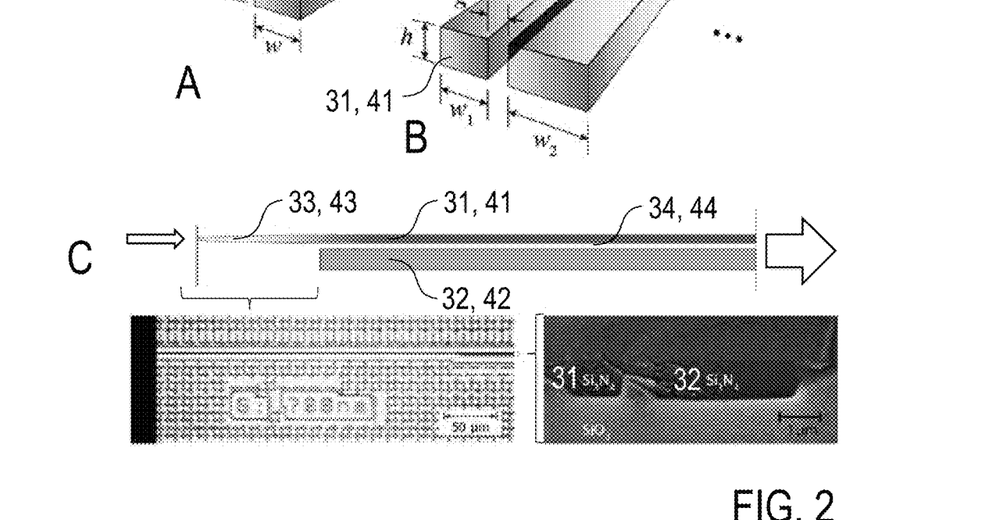
FIG. 2: further details of preferred embodiments of the inventive dual-frequency-comb spectrometer.

Details of the first and second waveguide devices 30, 40 are shown in FIG. 2. FIG. 2A shows a single core waveguide of a conventional technique for supercontinuum generation of a mid IR frequency comb (prior art). One single core waveguide has two geometric degrees of freedom only, comprising the height h and the width w, for influencing the dispersion landscape during frequency comb generation. On the contrary, the multi core structure of the waveguide devices 30, 40 as used by the invention and shown in FIG. 2B, has more geometric degrees of freedom in controlling the cross section geometry and thus controlling the dispersion landscape, in particular, comprising the height h, the widths $w_1$, $w_2$ and the gap g of/between the waveguides 31, 41, 32, 42 (examples see below). With increasing the number of waveguides, the number of degrees of freedom even is increased.

The top-view layout of the waveguide devices 30, 40 in FIG. 2C illustrates that an input section 33, 43 is a single-core waveguide with a double-inverse taper at the beginning, for pumping a selected mode, while the mid-IR continuum will be generated and propagated in both cores in a subsequent multi-core waveguide section 34, 44. An exemplary microscopic picture of the waveguide input section 33, 43 and a scanning electron microscopic (SEM) picture of the multi-core waveguide section 34, 44 are presented in the lower portion of FIG. 2C.

Figure 3:
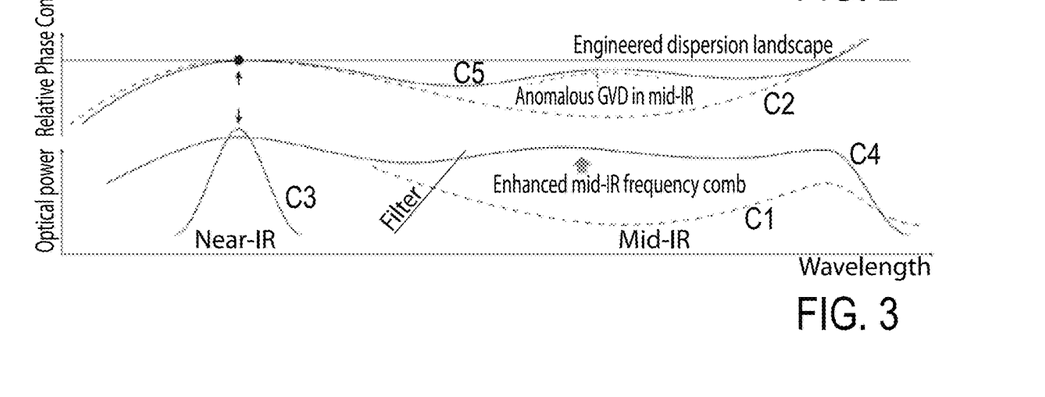
FIG. 3: an illustration of designing the dispersion landscape of a waveguide device.

FIG. 3 illustrates the principle of enhanced mid-IR continuum generation serving as the frequency comb, which corresponds to a dispersion landscape that is engineered and flattened in the mid-IR, particularly by the anomalous GVD produced in the coupled waveguide of the multi-core waveguide section 34, 44, as described with further details in the following. In FIG. 3, the dashed curves C1 and C2 represent the optical power and relative phase constant of a frequency comb generated by the pump pulse (curve C3) in the conventional single core waveguide, while drawn curves C4 and C5 represent the optical power and relative phase constant of a frequency comb generated with the multi-core waveguide of the invention.

The geometry (width and height) of the single waveguide, e. g. according to FIG. 2A, can be controlled to achieve dispersion engineering, leading to mid-IR dispersive waves [17]. However, this control poses limitations to achieve high power conversion efficiency and ultra-broadband mid-IR continuum. Therefore, the inventors employ an advanced technique based on coupled structures consisting of multiple single core waveguides as shown in FIG. 2B. Such a structure is designed based on the knowledge on a directional waveguide coupler [29], where strong supermode dispersion is induced as a result of spatial mode coupling ([30] to [34]). FIG. 2B shows utilizing a dual-core waveguide device, though this technique can be extended to more parallel single core waveguides.

When two single core waveguides are in close proximity, the optical mode propagating in one core is coupled to the other core, which effectively changes its phase, i.e. the propagation constant of the mode ($\beta(\omega)$, $\omega$ is the angular frequency of the light). In this way, the group velocity dispersion (GVD) is also changed as it corresponds to the frequency-dependent phase change induced by the mode coupling (GVD=$\partial 2\beta/\partial\omega 2$). Physically, mode coupling leads to the hybridization of mode-field distributions, resulting in a pair of hybrid modes that are symmetric and anti-symmetric superpositions of the original waveguide modes (supermodes) [35]. The coupling induced dispersion is then reflected by the phase profile of hybrid modes, which is curved to bridge that of original waveguide modes, and feature avoided crossing between each other.

Deterministically, anomalous GVD is produced by the anti-symmetric mode, while normal GVD is in the symmetric mode. In principle, such mode coupling (formally referred as mode hybridization) can be engineered at arbitrary wavelength region, particularly in the mid-IR where anomalous GVD is essential for tailoring a flattened dispersion landscape (FIG. 3), but is hardly accessible in conventional single-core waveguides. The dispersion landscape can be considered as relative propagation constant compared with pump pulses (assumed as solitons):

$$\Delta\beta(\omega) = \beta(\omega) - \beta_s(\omega) \quad (1)$$

$$= \beta(\omega) - (\beta(\omega_s) + v_g^{-1}(\omega - \omega_s)) \quad (2)$$

where $\beta_s(\omega)$ indicates the dispersionless phase profile of the soliton pulse, $\omega_s$ is the angular frequency of the pump and $v_g$ is the soliton group velocity.

Tuning the Dispersion Landscape

The inventors have tested the effect of tuning the waveguide geometry parameters on the mid-IR spectral structure via the supercontinuum process with the results summarized below and shown in FIG. 4. During the test, the pumping condition for all spectra is similar (pulse energy ~1 nJ) and the waveguide length is always 5 mm. Generally, it has been found that the mid-IR continuum is built up by two parts: a long wavelength edge is raised by the mid-IR dispersive wave that is determined by the phase matching; a moderate-wavelength part (in between the dispersive wave and the edge of the broadened soliton sideband) that is by the mode hybridization where the dispersion landscape is changed such that the overall phase mismatch is reduced. As a result, it can be observed that by decreasing the gap distance between the two $Si_3N_4$ cores, the mid-IR dispersive wave is slightly shifted to longer wavelengths, and in the meantime, the effect of mode hybridization on raising the moderate-wavelength part is reduced. The latter is counter-intuitive as a closer gap usually means stronger mode coupling effect. However, this increased mode coupling would also involve a large wavelength span such that the relative phase-change over wavelength (which is directly linked to the induced group velocity dispersion) is reduced.

The fingerprint of the mode hybridization is also revealed by measured orthogonal polarized light generation with respect to the pump. While the pump beam is coupled to the horizontally polarized TE00 mode in the narrow core, the moderate-wavelength part is supported by a narrow-band vertically polarized beam with its wavelength in accordance to the designed mode coupling region. This orthogonal polarized beam is found almost independent on the change of the geometry, i.e. the gap distance as well as the width of the wide waveguide core.

Figure 4:
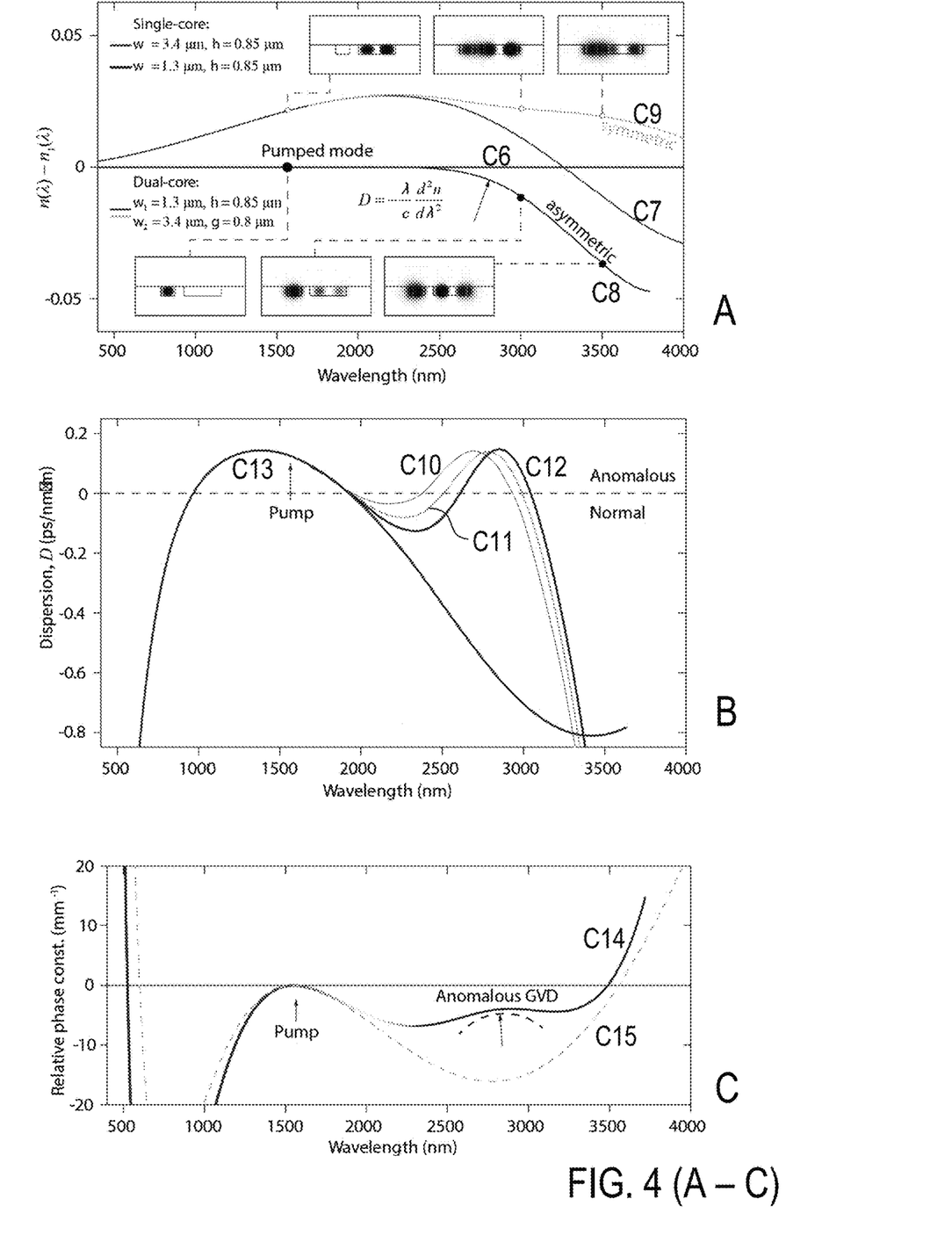
FIG. 4A: a schematic illustration of the electric field distribution of the hybrid modes at different wavelengths.
FIG. 4B: a graph of calculated dispersion (curves C10, C11 and C12) of the asymmetric mode in dual-core waveguides with three gap distances of 0.6 µm (C10), 0.7 µm (C11) and 0.8 µm (C12), which evolves from the pumped mode (curve C13)
FIG. 4C: a graph of the calculated dispersion landscape in a $Si_3N_4$ dual-core waveguide device (curve C14, geometric parameters as indicated in FIG. 4A), compared with that in a single-core waveguide (curve C15, geometric parameters as indicated in FIG. 4A)
FIGS. 4D, 4E and 4F: infrared spectra.

FIG. 4 further illustrates the considerations for designing the $Si_3N_4$ dual-core waveguide device 30 or 40. FIG. 4A represents the calculated effective refractive indices of (curve C6) the fundamental TE00 mode in a narrow $Si_3N_4$ core (width w=1.3 µm); (curve C7) TE10 mode in a wide core ($\omega$=3.4 µm; and (curves C8 and C9) two hybrid modes in the coupled dual-core waveguide (gap distance g=0.8 µm). The height of $Si_3N_4$ cores is h=0.85 µm). Such refractive indices are shown as relative difference to the index of TE00 mode in the narrow core (n1($\lambda$)), which is also the selected pump mode. The insets of FIG. 4A schematically illustrate the electric field distribution of the hybrid modes at different wavelengths. FIG. 4B represents the calculated dispersion (curves C10, C11 and C12) of the asymmetric mode in dual-core waveguides with three gap distances of 0.6 µm (C10), 0.7 µm (C11) and 0.8 µm (C12), which evolves from the pumped mode (curve C13) and produce anomalous GVD in the mid-IR. FIG. 4C represents the calculated dispersion landscape in a $Si_3N_4$ dual-core waveguide device (curve C14, geometric parameters as indicated in FIG. 4A), compared with that in a single-core waveguide (curve C15, geometric parameters as indicated in FIG. 4A). Both feature the phase matching (zero point) in the mid-IR (about 3500 nm).

With more details, the cross-section of the two $Si_3N_4$ single core waveguides are separately selected, in which two modes (one from each core) feature hybridization in the mid-IR region, by matching their propagation constants, (or equivalently by matching the effective refractive index ($n_{eff}$), since $8=n_{eff}\omega/c$, c indicates the speed of light in vacuum). For a choice of $Si_3N_4$ core widths of $w_1$=1.3 µm and $w_2$=3.4 µm, respectively, and for an identical core height of h=0.85 µm, the fundamental TE00 mode in the narrow core and the TE10 mode in the wide core have the same $n_{eff}$ at the wavelength of 3200 nm (FIG. 4A). The propagation constant and the mode-field distribution of hybrid modes are calculated for a coupling gap of g=0.8 µm, which exhibit strongly curved phase profile in the mid-IR compared with the original waveguide mode (the TE00 mode in the narrow core is selected as the reference). Therefore, strong and dominant anomalous GVD is produced in the mid-IR (centered at 3200 nm, see FIG. 4B). Counterintuitively, the larger change in dispersion is not achieved by closer proximity of the two single core waveguides, since the latter causes the hybridization region to occur over a larger spectral bandwidth such that the frequency-dependent phase change is reduced.

Moreover, to exploit anomalous GVD in the mid-IR for engineering the supercontinuum, it is preferred to selectively excite the anti-symmetric mode only. This is accomplished by designing the waveguide input section 33, 43 (see FIG. 2C) to be a single-core waveguide (with an inverse taper in the beginning [28], which excites the TE00 mode, followed by the dual-core section 34, 44. The length of the input section 33, 43 is chosen such that the pulse propagation enters into the dual-core section 34, 44 before significant broadening occurs. In this way, the spectral broadening will extend into the coupling region in the dual-core waveguide, and excite the anti-symmetric mode in the mid-IR. The designed dispersion landscape is shown in FIG. 4C, in which the mid-IR portion is particularly tailored and flattened.

FIG. 4D represents experimentally observed supercontinuum generation in a $Si_3N_4$ dual-core waveguide device (e.g. according to FIG. 2B), which features ultra-broadband mid-IR continuum from 2000-3800 nm (OSA: optical spectral analyzers; FTIR: Fourier-transform infrared spectrometer. FIG. 4E represents experimentally observed supercontinuum generation in a conventional single-core waveguide ($\omega$=1.85 μm), which leads to a mid-IR dispersive wave generated at 3800 nm. FIG. 4F shows spectrally overlapped two mid-IR continua from two separate $Si_3N_4$ dual-core waveguide devices, with similar cross-section geometry.

With more details, the experiments presented in FIGS. 4D to 4F for mid-IR supercontinuum generation in $Si_3N_4$ coupled waveguide devices have been carried out as follows. The single core waveguides of the waveguide devices are fabricated using the photonic Damascene process with a crucial reflow step to largely reduce the scattering losses caused by sidewall roughness (see e. g. [36]). Thermal annealing steps can be used, in order to reduce the hydrogen content and the related absorption losses [37]. The waveguide length is 5 mm including the inverse taper input section 33, 43 at the beginning.

In waveguides similar to the design, supercontinuum generation was observed (FIG. 4D), which is seeded by frequency comb source device 10 (see FIG. 1) comprising an amplified femtosecond fiber laser in the telecom-band (pulse duration <70 fs, maximum averaged power >350 mW, pulse energy >1 nJ, repetition rate about 250 MHz). Significantly, with respect to the pumped wavelength (i.e. 1550 nm) the supercontinuum is mostly extended to the long wavelength side, leading to ultra-broadband mid-IR continuum ranging from 2000-3700 nm, while at the short wavelength side, it features a sharp edge (stopping at 1000 nm) followed by a dispersive wave in the visible range (at 600 nm). The spectral envelope exactly reflects the designed dispersion landscape, i.e. the spectrum amplitude is inverse proportional to the relative phase constant. The dispersive wave is generated by its phase matching to the pump pulse (cf. the zero-valued relative phase constant in the dispersion landscape), and with the group velocity exceeding the pump wave, as it behaves analogous to Cherenkov radiation. Significantly, filtering out the mid-IR continuum by an edge-filter (cut-on at 2500 nm), measured the net power in the mid-IR is measured to be 1-3 mW, depending on the intensity of the pump. Such a power level comprises already the insertion loss of the waveguide and the loss in the light collecting component (e.g. a mid-IR collecting length that has a transparency of ~70%). The conversion efficiency is then estimated 1-5%, producing thereby sufficient power to implement dual-comb spectroscopy. The inventors also observed a narrow-band mid-IR wave generation in the opposite polarization direction to the pump wave, at mode coupling wavelength 3200 nm. This radiation is understood as the result of mode hybridization such that the polarization of the mode in the coupling region is rotated as well.

For comparison, the inventors also performed the supercontinuum experiment in a conventional single-core waveguide (FIG. 4E). This waveguide, with a selected core width (w=1.85 μm), can feature the dispersive wave generation at 3800 nm. Comparing the mid-IR continuum in the dual-core and the dispersive wave in the single-core waveguide demonstrates an enhancement in terms of both the intensity and the spectral coverage. In particular, while the dispersive wave in the single-core waveguide is detached spectrally from the main pulse, due to significant phase mismatch at intermediate wavelengths (FIG. 4C), the latter is strongly reduced in the case of dual-core waveguides such that the mid-IR continuum can exhibit a broader spectrum that covers the important spectroscopic window 2500-3500 nm.

From separate $Si_3N_4$ waveguide chips, similar mid-IR continuum can be generated with similar dual-core waveguide devices (FIG. 4F). A high level of spectral overlap is implemented, which is essential for building up the dual-comb spectrometer 100 of FIG. 1.

Modelling the Dispersion Landscape

In theory, nonlinear wave propagating dynamics in a waveguide can be described by the following wave equation: (it is sufficient to consider the spontaneous response in the cubic nonlinearity)

$$\frac{\partial \tilde{E}(\omega, r)}{\partial z} = -i\beta(\omega)\tilde{E}(\omega, r) - i\frac{\omega \chi^{(3)}}{2cn}\mathcal{F}[E(t,t)^3]_\omega \quad (3)$$

where E(t, r) indicates the electric field of the light wave in the time domain (t-axis), and its amplitude spectral density is $\tilde{E}$ ($\omega$, r) in the frequency domain ($\omega$-axis), namely via the Fourier transform (operator F) there has: $\tilde{E}$ ($\omega$, r)=∫dtE(t, r)$e^{-i\omega t}$=Δ F [E(t, r)]$_\omega$; r={x, y, z} indicates the space frame and the light propagation direction in the waveguide is defined as the z-axis; β($\omega$) indicates the propagation constant of the light wave in a waveguide, which is frequency dependent reflecting dispersion properties; n is the effective refractive index of the waveguide; $\chi$(3) is the cubic nonlinear susceptibility of the waveguide material; c is the speed of light in vacuum. The electric-field can be further expressed as:

$$\tilde{E}(\omega, r) = \tilde{B}(\omega, x, y)\tilde{A}(\omega, z) \quad (4)$$

with $\tilde{B}$ the normalized mode distribution such that: ∫∫dxdy $B^{-2}$=1. Thus the propagation dynamics of the light field is enfolded in $\tilde{A}$ and the Eq. 3 can be modified to: (if only considering the nonlinear phase modulation effect, i.e. the Kerr nonlinearity)

$$\frac{\partial \tilde{A}(\omega, z)}{\partial z} = -i\beta(\omega)\tilde{A}(\omega, z) - i\frac{\omega}{c}\frac{\chi^{(3)}}{2nA_{\mathit{eff}}}\mathcal{F}[|A(t,z)|^2 A(t,z)]_\omega \quad (5)$$

where information of the mode confinement in the waveguide is reflected on the parameter of the effective mode area, $A_{\mathit{eff}}$.

Furthermore, the case is considered wherein the light wave consists of both a primary wave packet (seeded by the pump wave and assumed as solitons) $\tilde{A}_s$ and a nonlocal small wave $\tilde{\sigma}$ (i.e. the dispersive wave). Therefore, in the frequency range w>0, it is defined:

$$\tilde{A}(\omega>0, z) = \tilde{A}_s(\Omega, z)e^{-i\beta_s z} + \tilde{\sigma}e^{-i\beta(\omega_d)z} \quad (6)$$

where $\Omega = \omega - \omega_s$ defines a relative frequency frame with respect to the pumping frequency $\omega_s$; $\beta_s(\Omega)$ indicates the phase constant of the soliton, which is dispersionless, i.e.:

$$\beta_s(\Omega) = \beta(\omega_s) + \Omega\beta^{(1)}(\omega_s) \quad (7)$$

$$\beta(m)(\omega) = \frac{\partial^m}{\partial \omega^m}\beta(\omega)$$

indicates the m-th order of dispersion with respect to $\omega_s$; $v_g = 1/\beta(1)(\omega)$ is also known as the group velocity of the soliton; $\omega_d$ indicates the central frequency of the small wave and $\omega_d \neq \omega_s$.

Using Eq. 6 in Eq. 5, we obtain the following equations:

$$\frac{\partial \tilde{A}_s}{\partial z} = -i\Delta\beta(\omega)\tilde{A}_s - i\frac{\omega}{c}\frac{3\chi^{(3)}}{8nA_{eff}}\mathcal{F}[|A_s|^2 A_s]_\Omega \quad (8)$$

$$\tilde{\sigma} \approx \tilde{A}_s e^{i\Delta\beta(\omega_d)z} \quad (9)$$

where $\tilde{A}_s = \mathcal{F}[A_s]_\Omega$. Equation 8 is written in the frequency domain ($\Omega$-axis), and its form in the time domain is the well-known nonlinear Schrödinger equation with full dispersion (i.e. the dispersion landscape), namely $$\Delta\beta(\omega) = \beta(\omega) - \beta_s = \sum_{m\geq 2}\frac{\beta^{(m)}}{m!}\Omega^m.$$

In particular, with anomalous group velocity dispersion (GVD), i.e. $\beta^{(2)}<0$, solitons are supported in the waveguide. Equation 9 is derived at the sideband of $\tilde{A}\tilde{\ }$s, i.e. when $\omega=\omega_d$, and the nonlinear effect is also neglected.

Significantly, from Eq. 9, the phase matching condition between $\tilde{A}\tilde{\ }_s$ and $\tilde{\sigma}\tilde{\ }$ is: $\Delta\beta(\omega_d)=0$. This is also understood as the phase matching between the soliton and the dispersive wave (Note: soliton would have an extra nonlinear induced phase constant (q) enfolded in $\tilde{A}\tilde{\ }_s$, which however is usually small valued and is neglected). Moreover, the conversion efficiency of the dispersive wave depends on the intensity of the soliton sideband. Described by Eq. 8, $A_s$ would experience the nonlinear self-phase modulation (second term on the right hand side) that in the frequency domain, results in its spectral broadening (i.e. raising the sideband power). Conventionally, this effect will be counterbalanced by certain dispersion in the system, i.e. $\Delta\beta(\omega)\neq 0$. Nevertheless, the maximum sideband power comes where there is the lowest dispersion, i.e.: $\Delta\beta(\omega)\to 0$.

Therefore, apart from the phase matching condition, the overall landscape of $\Delta\beta$ actually determines the conversion efficiency of the dispersive wave, which in the range $\omega\in[\omega_s, \omega_d]$ can be assimilated to a "spectral barrier" between the soliton and the dispersive wave. The purpose of our design is indeed to implement a flattened and reduced dispersion landscape, in the mid-IR, such that the supercontinuum generation can be broadband with enhanced efficiency.

Experimental Results

Figure 5:
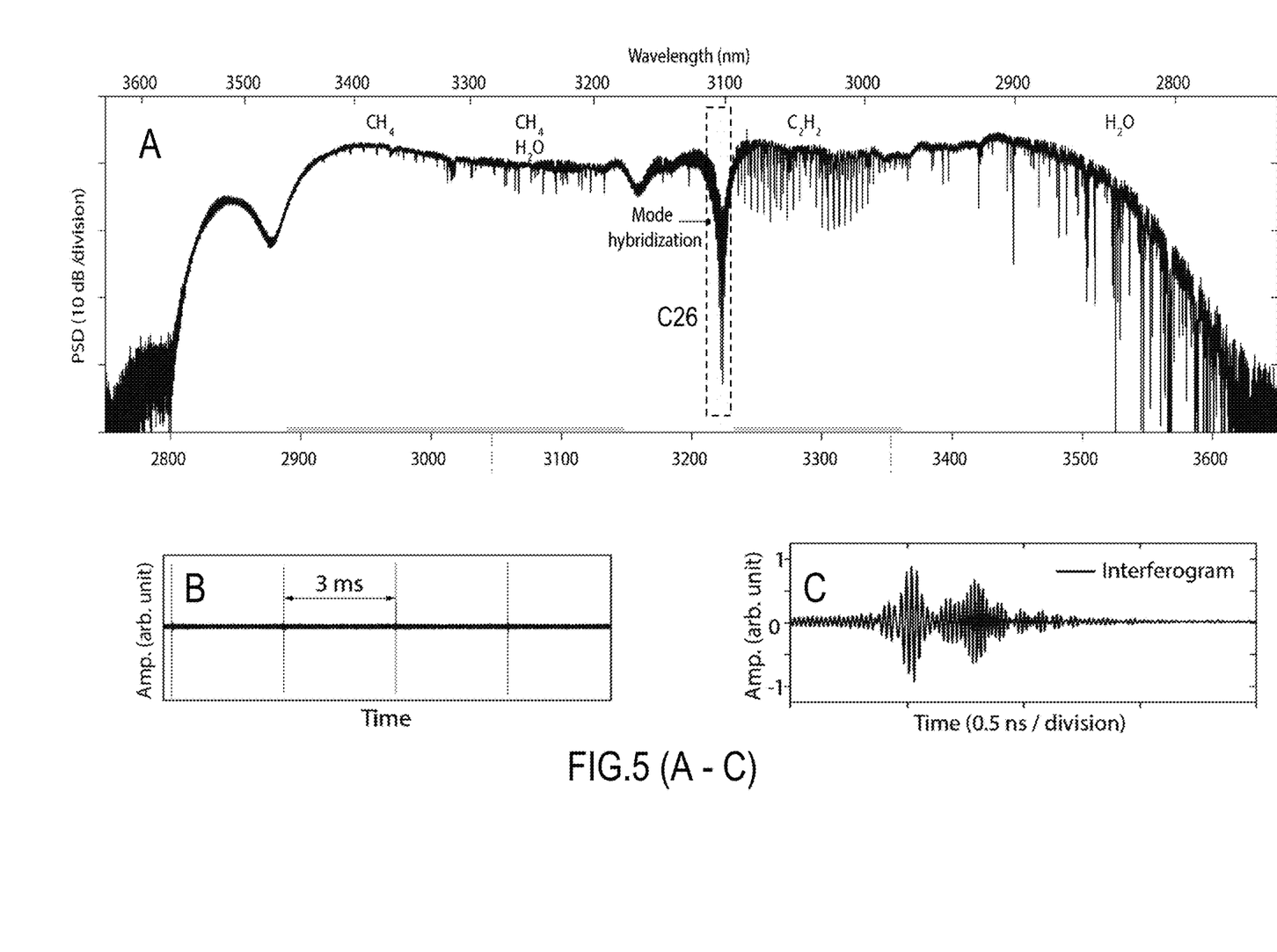
FIG. 5A: an infrared spectrum.
FIGS. 5B and 5C: temporal interferogram traces recorded by a detector device.
FIG. 5D: an infrared spectrum of measured gas absorbance for methane (C27) compared with HITRAN database curves inverted for clarity (C28)
FIGS. 5E and 5F: infrared spectra showing details of gas absorbance (curves C27), including both the intensity and the phase information, in comparison with the HITRAN database (curves C28)
FIG. 5G: an infrared spectrum of measured gas absorbance for acetylene (C27) compared with HITRAN database curves inverted for clarity (C28)
FIGS. 5H and 5I: infrared spectra showing details of gas absorbance (curves C27), including both the intensity and the phase information, in comparison with the HITRAN database (curves C28)

FIG. 5 illustrates experimental results of gas-phase detection enabled by the ultra-broadband mid-IR dual-frequency-comb spectrometer 100 of FIG. 1. FIG. 5A represents a retrieved mid-infrared spectrum from the detected and coherent averaged interferogram trace, after the averaging of 52 s (net data acquisition time), which covers a large span from 2800-3600 $cm^{-1}$.

The gas species in the gas cell, i.e. methane and acetylene, as well as water vapor in the circumstance, are featured as sharp absorbance in the spectrum. FIGS. 5B and 5C show the temporal interferogram trace recorded by the detector device 60. The encircled area C26 marks the mode hybridization region which exhibits a big dip in the retrieved spectrum. In FIGS. 5D and 5G, the measured gas absorbance (curves C27), methane (FIG. 5D) and acetylene (FIG. 5G) are compared with the HITRAN database (curves C28, inverted for clarity) in a large span of wavenumbers. The gas cell of the sample receptacle 1 (see FIG. 1) has a total pressure of e. g. 1 atm, with methane at 136.4 ppm, acetylene at 406.5 ppm, and nitrogen as the buffer gas. FIGS. 5E, 5F, 5H and 5I show details of gas absorbance (curves C27), including both the intensity and the phase information, in comparison with the HITRAN database (curves C28). Residual data from the fitting is also presented (curves C29), an offset value is artificially imposed merely for plotting purpose, and the dashed lines assist to know the range of the residual data.

With more details, FIG. 5 shows the result of mid-IR dual-comb gas-phase spectroscopy, where the spectral coverage is 2800-3600 $cm^{-1}$ (about 25 THz) corresponding to the number of comb teeth of 100,000. The spectrum shown in FIG. 5A is retrieved from a coherent averaged temporal interferogram pattern which in the Fourier domain corresponds to the RF comb constructed by the interference of the two optical frequency combs. The sample receptacle 1 (see FIG. 1) is a gas cell with a length of 104 cm and with wedged sapphire windows to avoid etalon effects. The sample receptacle 1 is filled with low concentration of methane and acetylene as targeted gas species, and nitrogen as the buffer gas.

To extract the absorption spectrum, first the spectrum through the sample gas T is measured, then the cell is purged and filled back to the original pressure with pure nitrogen. Subsequently, the reference spectrum T0 is measured. The spectral absorbance is then determined via-ln(T/T0). The gas concentrations are extracted from the absorption spectrum via a nonlinear least square fitting with data (line center frequency, line intensity, pressure broadening and shift coefficients) from HITRAN 2016 database. The HITRAN phase spectra are calculated from the Kramers-Kronig transformation of the absorption spectra. The retrieved gas absorbance and phase spectra agree very well with HITRAN database (FIGS. 5D to 5I). In addition the water vapor in the circumstance was also detected as about 1.8%.

Figure 6:
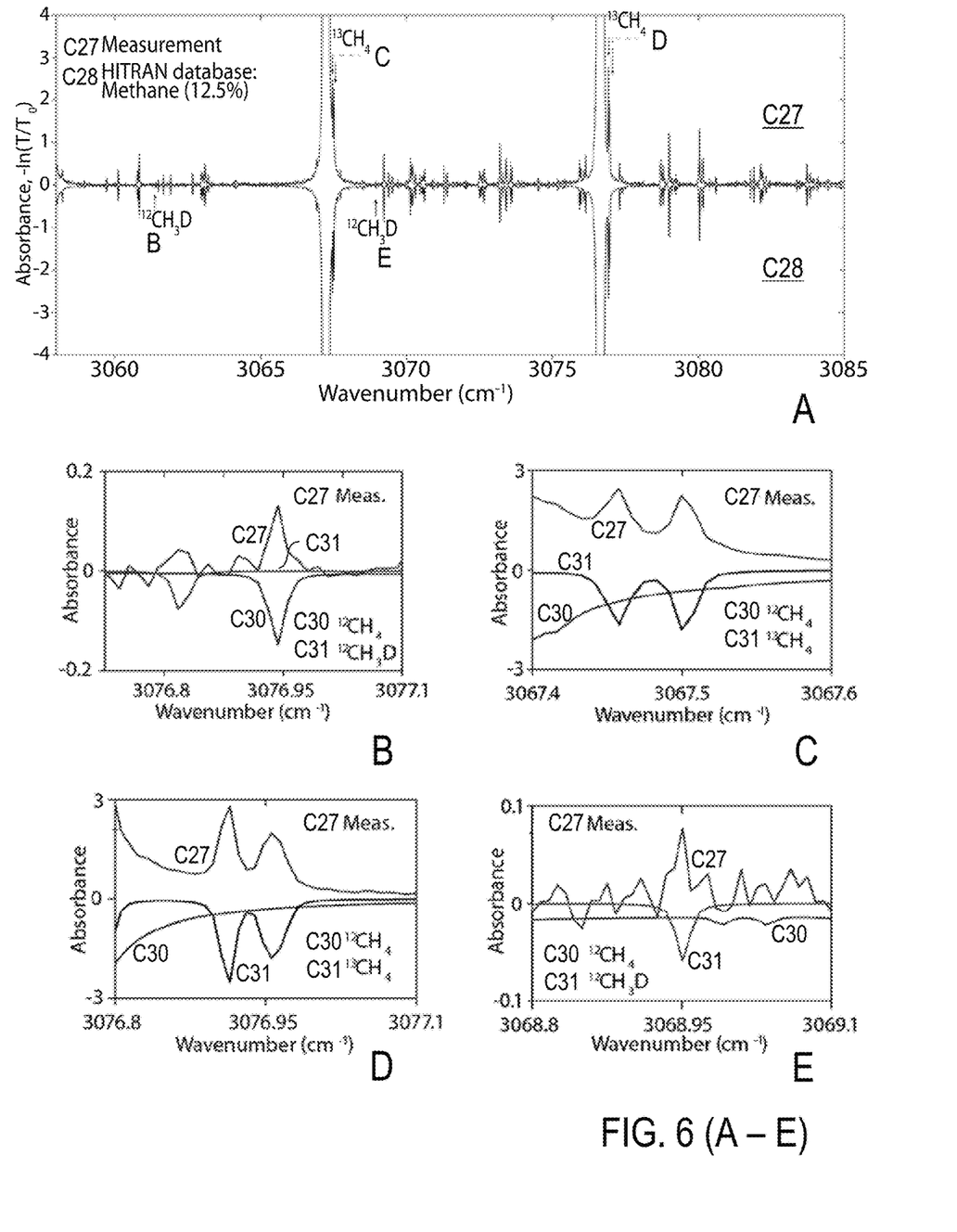
FIGS. 6A, 6B, 6C, 6D and 6E: infrared spectra showing experimental results demonstrating the spectral resolution of the spectroscopic detection with the example of detecting methane isotopologues.

The performance of the inventive supercontinuum-based mid-IR dual-comb spectroscopy is also benchmarked by successful detection of natural isotopologues of methane (FIG. 6), i.e. $^{12}CH_4$, $^{13}CH_4$ and $^{12}CH_3D$. Measured absorbance of methane (curve C30) is compared with the HITRAN database (curve C31, inverted for clarity), in the case of high concentration, i.e.~12.5% (FIG. 5A). The total pressure of the gas cell is ~0.1 atm. FIGS. 5B to 5E show the absorbance of $^{12}CH_4$, $^{13}CH_4$ and $^{12}CH_3D$, at selected regions B to E.

For this measurement, the gas cell is operated at low pressure such that the collisional broadening of spectral lines is reduced and those corresponding to isotopologues (i.e. $^{13}CH_4$, natural abundance 1.11%; $^{12}CH_3D$, 0.06%) can be resolved as separated from traditional elements ($^{12}CH_4$). In experiments, the pressure of the gas cell is set to be about 0.1 atm and the methane concentration is about 12.5%. At this pressure, the full-width-at-half-maximum spectral linewidth of methane is reduced to about 480 MHz, which is both sufficient for separating isotopes, and resolvable by our sub-Doppler resolution (i.e., 250 MHz, determined by the mode spacing) of the mid-IR frequency comb. The capability of identifying natural abundance of isotopes is of high importance as it provides signatures in earth science as well as in cosmology.

In conclusion, the inventors have demonstrated a high-performance mid-IR dual-comb spectrometer based on the supercontinuum process in nano-fabricated non-linear $Si_3N_4$ waveguides. The inventive use of coupled single core waveguides has enabled strong and dominant supermode dispersion in the mid-IR, particularly the anomalous GVD that is essential for generating flat-envelope, ultra-broadband mid-IR frequency combs. Based on this regime, the dual-comb spectrometer 100 can cover a large wavelength span, covering most of the functional groups window (2800-3600 $cm^{-1}$) and allowing for parallel gas-phase detection of trace gas. Such supercontinuum based dual-comb spectrometer 100 has not only detected traditional chemical species, e.g. methane and acetylene, but can also trace their isotopologues, including methane-C13 and mono-deuterated methane. This is enabled by the high-SNR of the spectrometer, which has a peak value of about $25/\sqrt{s}$. With the bandwidth consisting of more than 100,000 comb modes, the figure of merit is $>10^6/\sqrt{s}$, which is comparable with those DFG-based mid-IR dual-comb spectrometer.

The long wavelength edge of the spectrometer 100 can be limited, e. g. to 4.0 μm by a $SiO_2$ cladding in the fabrication of $Si_3N_4$ waveguides. In particular, although $Si_3N_4$ shows a much larger transparency window reaching the beginning of the backbone region (5 μm), mode coupling will expose the light propagation mostly in the cladding and therefore feature strong loss in $SiO_2$. Such a problem can be solved with air-cladding waveguides or substrates that are mid-IR transparent (e.g. using sapphire substrate).

The features of the invention disclosed in the above description, the drawings and the claims can be of significance individually, in combination or sub-combination for the implementation of the invention in its different embodiments.

What is claimed is:

1. A dual-frequency-comb spectrometer, being configured for a spectroscopic investigation of a sample, comprising
a first frequency comb source device being configured for emitting a first sequence of laser pulses with a first repetition frequency along a first light path,
a second frequency comb source device being configured for emitting a second sequence of laser pulses with a second repetition frequency along a second light path, wherein the second repetition frequency has a frequency offset relative to the first repetition frequency and the second light path is configured to accommodate the sample to be investigated,
a first waveguide device being arranged in the first light path for receiving the first sequence of laser pulses and for creating a first frequency comb by supercontinuum generation,
a second waveguide device being arranged in the second light path for receiving the second sequence of laser pulses and for creating a second frequency comb by supercontinuum generation, wherein the second light path is configured for irradiating the sample with the second frequency comb,
a detector device being arranged in a third light path where the first and second light paths are combined, for simultaneously sensing the first frequency comb and the second frequency comb after an interaction with the sample, and
a computing device being arranged for receiving an output of the detector device and being configured for calculating spectroscopic properties of the sample based on the output of the detector device, wherein
each of the first and second waveguide devices is a multi-core waveguide with a multi-core waveguide section comprising at least two separate single core waveguides having field-coupling via a coupling gap therebetween.

2. The dual-frequency-comb spectrometer according to claim 1, wherein:
one of the single core waveguides of the first waveguide device is a first input waveguide being arranged for receiving the first sequence of laser pulses, and
one of the single core waveguides of the second waveguide device is a second input waveguide being arranged for receiving the second sequence of laser pulses.

3. The dual-frequency-comb spectrometer according to claim 2, wherein:
each of the first and second input waveguides has an input section with a double-inverse taper of the waveguide shape, and
after the input section is the multi-core waveguide section.

4. The dual-frequency-comb spectrometer according to claim 3, wherein the input sections of the first and second input waveguides have a length being selected such that a pulse broadening point, where pulse broadening by supercontinuum generation starts, is after the input sections, and is within the multi-core waveguide section.

5. The dual-frequency-comb spectrometer according to claim 2, wherein:
each single core waveguide in the first and second waveguide devices has a rectangular cross-section shape, and
each of the first and second input waveguides has a width or a height which is different than remaining single core waveguides of the first and second waveguide devices.

6. The dual-frequency-comb spectrometer according to claim 1, wherein the first and second waveguide devices are monolithically formed on a common substrate.

7. The dual-frequency-comb spectrometer according to claim 1, wherein each of the first and second waveguide devices comprises two, three or four single core waveguides.

8. The dual-frequency-comb spectrometer according to claim 1, wherein the single core waveguides are made of $Si_3N_4$, Si, GaP or AlN.

9. The dual-frequency-comb spectrometer according to claim 1, wherein the single core waveguides have a width in a range from 0.01 μm to 5 μm and a height in a range from 0.01 μm to 2.5 μm.

10. The dual-frequency-comb spectrometer according to claim 1, wherein each coupling gap has a width in a range from 0.01 μm to 5 μm.

11. The dual-frequency-comb spectrometer according to claim 1, wherein each coupling gap is filled with $SiO_2$, $Al_2O_3$, or air.

12. The dual-frequency-comb spectrometer according to claim 1, wherein:
the first and second sequences of laser pulses have a center wavelength in a range from 750 nm to 2400 nm, and
the first and second frequency comb cover a spectral region from 4166.67 $cm^{-1}$ to 13333.33 $cm^{-1}$.

13. The dual-frequency-comb spectrometer according to claim 1, wherein:
the first and second sequences of laser pulses have a repetition frequency in a range from 1 MHz to 100 GHz, and
the frequency offset is selected in a range from 1 Hz to 100 MHz.

14. The dual-frequency-comb spectroscopy method for spectroscopic investigation of a sample, wherein the dual-frequency-comb spectrometer of claim 1 is used, comprising the steps of:

providing the sample in the second light path,
creating the first frequency comb by supercontinuum generation with the first waveguide device,
simultaneously creating the second frequency comb by supercontinuum generation with the second waveguide device,
interaction of the second frequency comb with the sample, so that a spectral content of the second frequency comb is changed,
simultaneous detection of the first and second frequency combs with the detector device, and
calculating spectroscopic properties of the sample based on the output of the detector device.

* * * * *